United States Patent
Marin et al.

(10) Patent No.: US 11,064,437 B2
(45) Date of Patent: Jul. 13, 2021

(54) POWER SAVING FOR WIRELESS DEVICE

(71) Applicant: Nokia Technologies Oy, Espoo (FI)

(72) Inventors: Janne Marin, Espoo (FI); Enrico Henrik Rantala, Berkeley, CA (US); Mika Ilkka Kasslin, Espoo (FI); Olli Petteri Alanen, Vantaa (FI)

(73) Assignee: Nokia Technolgies Oy, Espoo (FI)

( * ) Notice: Subject to any disclaimer, the term of this patent is extended or adjusted under 35 U.S.C. 154(b) by 0 days.

(21) Appl. No.: 16/468,636

(22) PCT Filed: Jan. 19, 2017

(86) PCT No.: PCT/US2017/014072
§ 371 (c)(1),
(2) Date: Jun. 11, 2019

(87) PCT Pub. No.: WO2018/136060
PCT Pub. Date: Jul. 26, 2018

(65) Prior Publication Data
US 2020/0084720 A1 Mar. 12, 2020

(51) Int. Cl.
*H04W 52/54* (2009.01)
*H04W 72/04* (2009.01)
*H04W 52/02* (2009.01)

(52) U.S. Cl.
CPC ... *H04W 52/0235* (2013.01); *H04W 52/0206* (2013.01); *H04W 52/0216* (2013.01);
(Continued)

(58) Field of Classification Search
CPC ............... H04W 52/206; H04W 52/54; H04W 52/0235
See application file for complete search history.

(56) References Cited

U.S. PATENT DOCUMENTS 9,374,784 B2    6/2016  Kondo et al.
2012/0155279 A1* 6/2012  Ho ................... H04W 74/08
                                                370/241
(Continued)

FOREIGN PATENT DOCUMENTS

WO    2016/160306 A1   10/2016
WO    2016/175435 A1   11/2016
WO    2018/111305 A1    6/2018

OTHER PUBLICATIONS

International Search Report and Written Opinion received for corresponding Patent Cooperation Treaty Application No. PCT/US2017/014072, dated Apr. 10, 2017, 12 pages.
(Continued)

*Primary Examiner* — Angel T Brockman
(74) *Attorney, Agent, or Firm* — Harrington & Smith

(57) ABSTRACT

According to an example aspect of the present invention, there is provided a method, comprising: transmitting a request frame, from a first wireless device to a second wireless device, the request frame indicating a at least one requested transmission window for receiving a wake-up frame via a wake-up radio, and receiving, by the first wireless device from the second wireless device, the wake-up frame via the wake-up radio during at least one allocated transmission window, wherein the at least one allocated transmission window is based on the at least one requested transmission window.

22 Claims, 4 Drawing Sheets

(52) U.S. Cl.
CPC ....... *H04W 52/0232* (2013.01); *H04W 52/54* (2013.01); *H04W 72/0446* (2013.01); *H04W 72/0473* (2013.01)

(56) References Cited

U.S. PATENT DOCUMENTS

| | | |
|---|---|---|
| 2016/0105850 A1 | 4/2016 | Wentink |
| 2016/0127995 A1 | 5/2016 | Merlin et al. |
| 2016/0374019 A1 | 12/2016 | Park et al. |
| 2016/0374022 A1 | 12/2016 | Ang et al. |
| 2016/0381638 A1 | 12/2016 | Min et al. |

OTHER PUBLICATIONS

Extended European Search Report received for corresponding European Patent Application No. 17892223.3, dated Jul. 8, 2020, 20 pages.

Kim et al., "Initial Negotiation for WUR", doc.: IEEE 802.11-17 / 0070r0, Jan. 16, 2017, pp. 1-9.

\* cited by examiner

| Element ID | Length | Wake-up Delay | Min Wake-up Interval | Target Wake-up Interval | Max Wake-up Interval |
|---|---|---|---|---|---|
| 1 | 1 | 2 | 2 | 2 | 2 |

Octets:

POWER SAVING FOR WIRELESS DEVICE

RELATED APPLICATION

This application was originally filed as PCT Application No. PCT/US2017/014072 on Jan. 19, 2017.

FIELD

The present invention relates to wireless communications, and in particular to an improved power saving for wireless devices.

BACKGROUND

Various power-saving mechanisms have been developed for wireless devices to allow a battery-operated device to "sleep" or enter an inactive mode between frame transmissions or when there is no data to transfer.

Wireless networks may have a power-save mode where a wireless device temporarily shuts down its main radio interface to reduce power consumption. In the sleeping state, the main radio may be temporarily shut down. The sleeping may have to be cancelled, e.g. for receiving information from the wireless network. The information may be provided in a beacon signal or another periodic broadcast signal, for example. There may be other reasons that cancel the sleeping and cause the device to activate its main radio interface for a frame transmission/reception.

With the fast increase of new devices being wirelessly connected and substantial traffic growth, requirements for wireless networks and connections are also changing. For example, various Internet of Things (IoT) devices may send occasionally or periodically send uplink data while having high requirements on power-saving.

SUMMARY

The invention is defined by the features of the independent claims. Some specific embodiments are defined in the dependent claims.

According to a first aspect of the present invention, there is provided a method, comprising: transmitting a request frame, from a first wireless device to a second wireless device, the request frame indicating a at least one requested transmission window for receiving a wake-up frame via a wake-up radio, and receiving, by the first wireless device from the second wireless device, the wake-up frame via the wake-up radio during at least one allocated transmission window, wherein the at least one allocated transmission window is based on the at least one requested transmission window.

According to a second aspect of the present invention, there is provided a method, comprising: receiving a request frame by a second wireless device from a first wireless device, the request frame indicating at least one requested transmission window for receiving a wake-up frame via a wake-up radio, and transmitting from the second wireless device to the first wireless device, the wake-up frame during at least one allocated transmission window, wherein the at least one allocated transmission window is based on the at least one requested transmission window.

There are also provided apparatuses, computer programs, and computer-readable mediums configured to carry out features in accordance with the first and/or second aspect.

EMBODIMENTS

Figure 1:
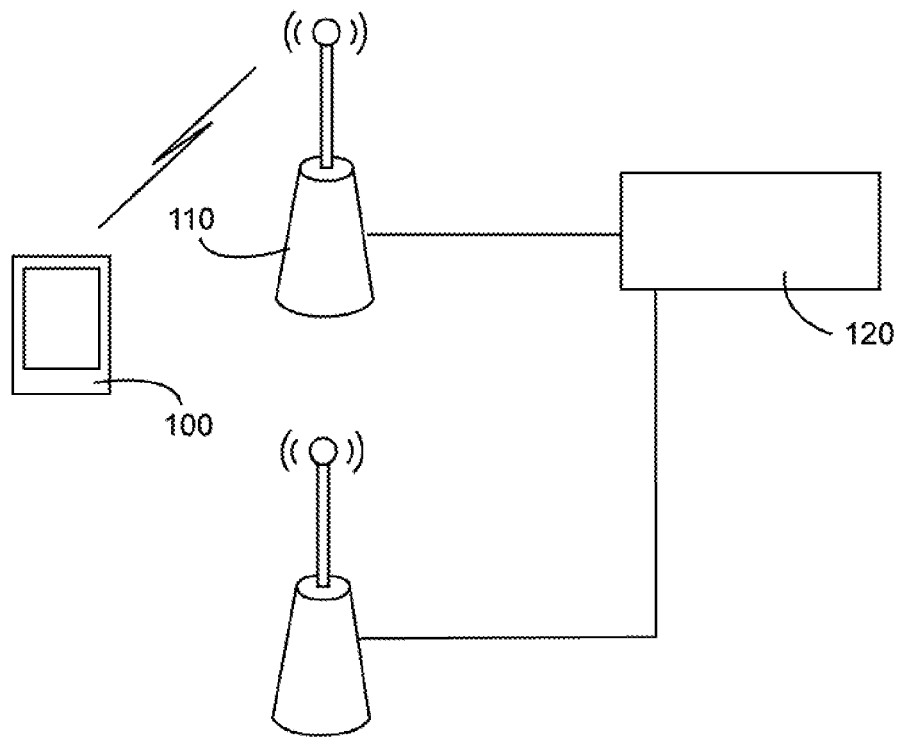
FIG. 1 illustrates a wireless communication system in which at least some embodiments of the present invention may be applied.

FIG. 1 illustrates an example wireless communication system. The wireless communication devices of FIG. 1 system comprise an access point (AP) 110 and a wireless terminal device (STA) 100. The access point may be associated with a basic service set (BSS) which is a basic building block of an IEEE 802.11-based wireless local area network (WLAN). The most common BSS type is an infrastructure BSS that includes a single AP together with all STAs associated with the AP. The AP may be a fixed AP or a mobile AP. The AP 110 may also provide access to other networks, such as the Internet. In an embodiment, the plurality of BSSs may interconnect to form an extended service set (ESS).

A terminal device 100 may establish and manage a peer-to-peer wireless network to which one or more other terminal devices may associate. In such a case, the peer-to-peer wireless network may be established between two or more terminal devices. The terminal device managing the network may operate as an access point or node providing the other terminal device(s) with a connection to other networks, such as the Internet. In other embodiments, such routing functionality is not employed and the connection terminates in the terminal devices.

The AP 110 may be connected to further network elements, in an embodiment a network management system (NMS) 120. The NMS may maintain channel usage information of wireless networks of one or more APs and to configure the channel usage of the wireless networks. For example, it may control wireless networks located close to each other to operate on different channels and hence avoid interference between the networks. In an embodiment, the network management system 120 is comprised in one of the APs, e.g. in the AP 110. In another embodiment, the network management system is realized by an apparatus different from the APs, e.g. by a server computer to which the APs may connect via a wired or wireless connection.

The terminal device 100 may discover the AP 110 through a network discovery process. A scanning device may actively transmit a scanning request message, such as a probe request message or a generic advertisement service (GAS) request, in order to obtain information of locally available access points or networks. Responding devices may transmit scanning response messages, such as probe response messages, comprising information on the responding device and its network. A terminal device 100 may establish a connection with any one of APs 110 it has detected to provide a wireless connection within the neighbourhood of the terminal device. The connection establishment may include authentication in which an identity of the terminal device is established in the AP. The authentication may comprise exchanging an encryption key used in the BSS. After the authentication, the AP and the terminal device may carry out association in which the terminal device is fully registered in the BSS, e.g. by providing the terminal device with an association identifier (AID).

Power consumption continues to be an issue with wireless networks and mobile communication. IEEE 802.11 working group has developed power-save mechanisms like a power save (PS) mode to save power when the STA 100 is associated to an AP 110. By default, an associated STA is in active mode which enforces it to stay in an awake state when the STA is fully powered and able to transmit and receive frames with the AP. An associated STA may transition to the PS mode with explicit signalling and, while operating in the PS mode, it may save power by operating occasionally in a doze state. In the doze state, the STA is not able to transmit or receive frames but, on the other hand, power consumption of the STA is on a considerably lower level than in the awake state. The STA may wake up from the doze state to receive periodic beacon frames from the AP. While the STA is in the doze state, the AP buffers frames addressed to the STA. When the STA is awake, the AP indicates with beacon frames (in a traffic indication map, TIM, field) whether it has frames buffered to the STA.

Recent developments in 802.11 work groups have involved introduction of a new low-power radio interface called a wake-up radio. One purpose of the new radio interface is to enable further power-savings by allowing a main radio, which may also be referred to as a primary connectivity radio, used for data communication according to 802.11 specifications to be off for longer periods. The low-power radio may be referred to as a wake-up radio (WUR) or a low-power WUR (LP-WUR), and it is considered to be a companion radio to the main radio. A wireless device such as the STA 100 may comprise both a WUR receiver and the main 802.11 radio. An AP 110 may comprise a WUR transmitter and the main 802.11 radio. It has been proposed that the purpose of the wake-up radio is mainly to wake-up the main radio when the AP has data to transmit to a sleeping STA.

The wake-up radio interface may be designed such that it consumes less power than the main radio. The wake-up radio may employ a simpler modulation scheme than the main radio, e.g. the wake-up radio interface may use only on-off keying while the main radio uses variable modulations schemes such as phase-shift keying and (quadrature) amplitude modulation. The wake-up radio interface may operate on a smaller bandwidth than the smallest operational bandwidth of the main radio, such as 5 Megahertz (MHz) or less for the wake-up radio and 20 MHz for the smallest bandwidth of the main radio.

The term wake-up radio refers herein generally to a radio used to wake up a main radio primarily used for wireless data transfer. The wake-up radio may be used only for waking up the main radio of a wireless device. In some embodiments, the wake-up radio of the wireless device may comprise only a receiver. In other embodiments, the wireless device may have both a WUR receiver and a WUR transmitter. The wake-up radio may thus be powered on when the main radio is powered off.

A wake-up radio of the STA 100 may be configured to receive and extract wake-up radio frames transmitted by a wake-up radio of the AP 110. The wake-up radio of the STA may be capable of decoding the wake-up radio frames on its own without any assistance from the main radio. The wake-up radio may thus comprise, in addition to a radio frequency front-end receiver components, digital baseband receiver components and a frame extraction processor capable of decoding contents of a wake-up radio frame. The wake-up radio frame may comprise a destination address field indicating a STA that should wake up the main radio. The frame extraction processor may perform decoding of the destination address from a received wake-up radio frame and determine whether or not the destination address is an address of the STA of the frame extraction processor. If yes, it may output a wake-up signal causing the main radio to wake up for radio communication with an AP.

The above-described use of the wake-up radio to wake up the main radio may be performed when the STA 100 is associated to the AP 110. When the STA disables the main 802.11 radio, it may enter a new power-saving mode or state, separate from the existing 802.11 power-saving modes, that is herewith referred to as a WUR mode, but may also be referred to as WUR state, a dormant or idle mode or state, for example. The WUR may be activated upon disabling the main radio. However, in other embodiments the WUR may be active also when the main radio is active. Detailed implementation of the use of the wake-up receiver and state synchronization between the AP and the STA is still under development.

A wireless device, such as the STA 100, may have occasionally/periodically some data to transmit in uplink, to cloud, for example. Such a device could activate its main radio whenever some data appears for transmission. After activating the main radio, the device needs to contend for channel access. If the channel is congested, the device needs to backoff and contend for channel access again when backoff timer is decremented again to zero. The device may need to do this several times, and thus a lot of power may be needed to finally get the data transmitted.

Figure 2:
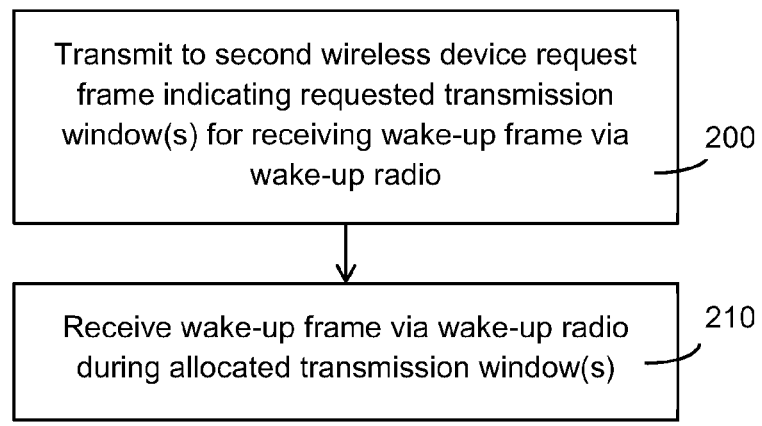
FIGS. 2 and 3 illustrate methods in accordance with at least some embodiments of the present invention.
Figure 3:
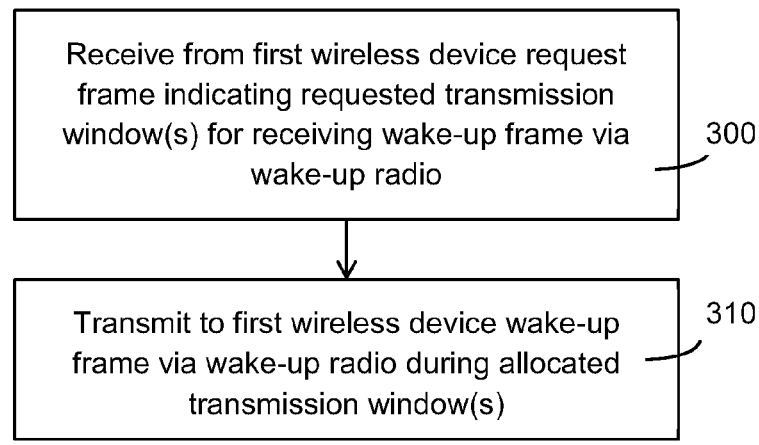

FIGS. 2 and 3 illustrate a solution for operating a dormant or wake-up radio mode. The methods may be implemented in an apparatus comprising or controlling two radio interfaces according to some embodiments of the invention. FIG. 2 illustrates a process for a first wireless device for operating a wake-up radio mode, such as the STA 100, while FIG. 3 illustrates a process for a wireless device such as the AP 110, controlling a wake-up radio in a first device.

Referring first to FIG. 2, the process comprises as performed by a first wireless device: transmitting 200 from the first wireless device to second wireless a request frame indicating a at least one requested transmission window for receiving a wake-up frame via a wake-up radio. At least one wake-up frame is received 210 via the wake-up radio during an allocated transmission window. The transmission window is to be understood broadly to cover a dedicated transmission resource by which the wake-up frame may be transmitted. There are many available options for indicating such transmission window, for example one or more transmission intervals may be explicitly defined or indicated.

With reference to FIG. 3, a request frame is received 300 by a second wireless device from a first wireless device, the request frame indicating at least one requested transmission window for receiving a wake-up frame via a wake-up radio. The wake-up frame is transmitted 310 from the second wireless device to the first wireless device during at least one allocated transmission window.

The allocated transmission window 210, 310 is based on the at least one requested transmission window. The allocated transmission window may thus be defined by the second wireless device on the basis of the requested transmission window. In some embodiments, the requested transmission window and the allocated transmission window may be the same. For example, the AP 110 may only confirm or reject the requested time window. In another embodiment, the requested transmission window is different than the allocated transmission window. The second device may propose or set the allocated transmission window, which may also be referred to as modified transmission window, different from requested one. In this latter case, the first device may need to confirm whether the modified parameters are acceptable.

The wake-up frame may be received 210 when a main radio of the first device is switched off and the main radio may be activated in response to receiving 210 the wake-up frame. The first wireless device may then transmit buffered uplink frames to the second wireless device via the main radio. However, it is to be noted that in some applications uplink data is not buffered but directly read from a data source. For example, the STA 100 may be a measurement device that upon receiving a wake-up frame reads a measurement value from a sensor and transmits it to the AP 110. Buffering requires some memory and in some cases it might be more beneficial to read the value directly from the source itself.

The methods illustrated in FIGS. 2 and 3 allow implementing the wake-up mechanism such that the first device activates its main radio only upon a request from the second device. This allows to avoid at least some wake-up logic and functionality due to upper protocol layer requiring to transmit uplink data during the wake-up radio mode, and to have very simple devices that simply operate under control of the second device during the wake-up radio mode. However, it is to be noted that instant main radio activation availability may be relevant e.g. in alarm applications.

In some embodiments, the second wireless device is a WLAN AP and the first wireless device is a WLAN terminal. This is assumed in the subsequent example embodiments, with reference to the AP 110 and STA 100. However, it is to be appreciated that in alternative embodiments a terminal device, such as the STA 100, may operate as the second wireless device and an access node, such as the AP 110 as the first device, whereby the AP may be set in WUR mode and woken up by wake-up frames during the transmission windows.

In some embodiments, the wake-up frames (WUFs) are scheduled to be transmitted 310 during the allocated transmission window(s) when channel occupancy is estimated to be below a threshold. This enables to further improve probability of success for the STA 100 to instantly obtain channel access when there is uplink data to be transmitted, whereby power may be saved due to avoided reattempts. For example, the AP may be configured to estimate channel congestion on the basis of channel occupancy information, measured energy levels and/or other measurement information. Such information may be used also for allocating the transmission window. It may be possible that a WUF is not transmitted during a transmission window if channel occupancy is not below the predefined threshold. For example, the channel occupancy may be estimated by measuring the time the channel is considered busy with means of carrier sensing in comparison to the overall measurement time. Another example is to estimate the channel occupancy by measuring the access delays of frames that have been queued for transmission.

In some embodiments, the request is transmitted 200 and received 300 via the main radio of the devices STA 100, AP 110. In other embodiments, the request is transmitted and received via the wake-up radio. It is to be noted that the STA 100 may be arranged to transmit 200, 300 the request during the WUR mode and the main radio active mode, by using the wake-up radio and the main radio, respectively.

In some embodiments, request 200, 300 is one of a wake-up sequence request, a wake-up radio mode request (or some other message for indicating or requesting activation of the WUR mode), a wake-up frame request, an association request with a wake-up parameter element, or a reassociation request with a wake-up parameter element. The wake-up sequence request may be a new message by which the transmission window may be requested. The request may comprise information indicating the transmission window, but may also comprise other WUR mode related configuration information.

The wake-up frame request may be a new message to request at least one wake-up frame and thus also the transmission window during the WUR mode. In this embodiment, the start of the transmission window may be initiated by the terminal together when requesting a WUF. Also in this embodiment, a WUF may be transmitted by the AP in a time moment, during a determined transmission window, in which channel congestion is low, for example below a certain threshold. In this embodiment, terminal has more control, which is benefit but may also be drawback due to increased terminal complexity.

However, it is to be appreciated that the above requests represent only some examples of messages by which the request 200, 300 may be delivered, and the indication of the request for transmission window may be included in any other suitable main radio or wake-up radio signaling message.

In some embodiments, a response to the request 200, 300 for the transmission window, such as one of the requests indicated in the previous paragraph, is transmitted between 300 and 310, and received between 200 and 210, the response indicating the allocated transmission window(s). The AP 110 may send the same WUR parameter information back to the STA 100. The information may be altered if the AP estimates that there is a sequence which would work better. Alternatively, the AP may send only information that it has received or accepts the wake-up parameters. This may be implicit by sending a response without any additional information but only by sending positive response frame accept parameters, or this can be explicit by having a new element included with accept or reject information included.

Upon receiving the response, the STA 100 may enter the WUR mode and switch off the main radio. There may be a further confirmation from the STA 100 to the response.

In some embodiments, the request 200, 300 for at least one transmission window indicates a request for periodical transmission windows for receiving a plurality of wake-up frames. Thus, the AP 110 may in 310 start to periodically transmit wake-up frames during such periodical allocated transmission windows. The STA may thus obtain periodical transmission windows as appropriate for given application/context, such as periodical reporting from an IoT sensor. In other embodiments, the request 200, 300 is for a non-periodical or single transmission window, such as the WUF request.

The request 200, 300 and/or the associated response may explicitly specify the requested/allocated transmission window. In other embodiments, the desired transmission window is not specified in the request 200, 300. However, also in the latter case, the request may comprise or indicate one or more parameters affecting the allocation of the transmission window, or there may be already existing configuration information (specific to the STA 100 or a group of devices) affecting the allocation.

In some embodiments, the request 200, 300 and/or the associated response comprises parameters that indicate a start time of the at least one transmission window and an end time of the at least one transmission window. The request may comprise a parameter indicating delay for activating the main radio of the STA 100. The request may comprise time interval information, some examples further explained below.

Figure 4:
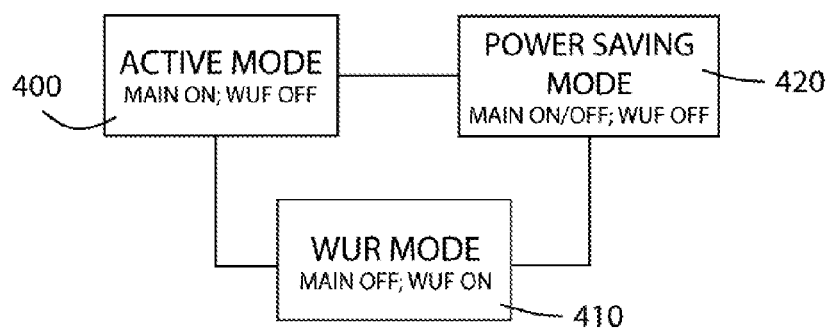
FIG. 4 illustrates wireless communications modes in accordance with at least some embodiments of the present invention.

FIG. 4 illustrates example modes for a wireless device, such as the STA 100 with the 802.11 main radio and the WUR. The main radio is on during the active mode 400. The main radio is off and the wake-up radio is on during the WUR mode 410. The WUR mode may be entered by WUR mode signalling between the STA and the AP: The STA may send a WUR mode request to the AP during the active mode via the main radio. The WUR mode may be entered after a WUR mode response by the AP. In the WUR mode there may be a keep alive process: If the STA does not receive any WUR frame for a maximum idle period, the STA may return to the active mode 400 to listen to frames or send a frame for keep alive checking. The STA may thus return to the WUR mode upon detecting a frame from its associated AP. It is to be noted that in some embodiments the WUR mode 410 may also comprise short periods when the main radio is on. In these embodiments, 410 may be considered as the dormant state.

There may be a further power-saving mode 420, such as the IEEE 802.11 PS mode mentioned above. During the power-saving mode 420 the main radio is on/off according to the applied power-saving mechanism, and the wake-up radio is off. It is to be appreciated that in some embodiments specific power-save mode is not applied or there is no transition between the power-saving mode 420 and the WUR mode 410.

Figures 5, 6:
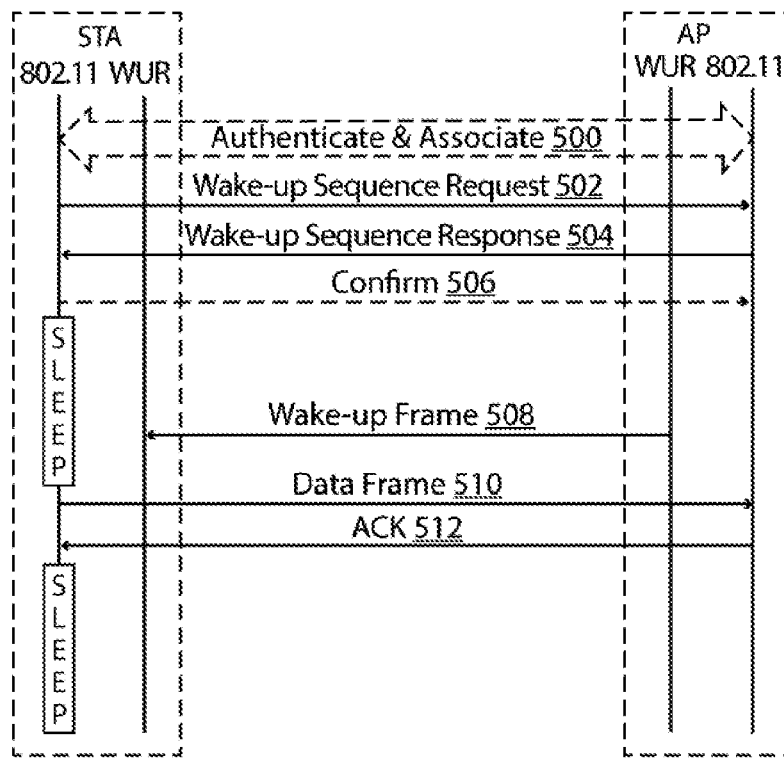
FIG. 5 illustrates signalling example in accordance with at least some embodiments of the present invention.
FIG. 6 illustrates a message element example in accordance with at least some embodiments of the present invention.

FIG. 5 illustrates signalling between IEEE 802.11 STA 100 and AP 110 according to an example embodiment. Upon detecting an available AP e.g. with Probe request/response signaling, authentication and association signalling 500 may be carried out between the STA and the AP. The STA may agree with the AP on the wake-up parameters that determine rules for the WUF transmission to the device over the WUR. The agreement may be carried out by a new frame exchange, by action frame based frames, for example.

FIG. 5 illustrates a new Wake-up Sequence Request 502, which may be the request 200, 300, and a new Wake-up Sequence Response 504, which may thus be used for the WUR parameter signalling. There may optionally be a further confirmation frame 506 for confirming the WUR parameters in the response 504. The STA then enters the WUR mode 410 and the main radio may be switched off. During the transmission window set with frames 502 and 504, the AP may send a WUF 508. The STA changes to active mode 400 and switches on the 802.11 main radio. If there is buffered uplink data, it may be transmitted 510 and acknowledged 512. The STA may then return to the WUR mode 410.

In some embodiments, new WUR parameter signaling is carried out by an existing frame by a new message element. For example, the WUR parameter signaling may be carried by the (Re)Association Request/Response pair or frames used in connection with transition to WUR mode, such as a WUR mode request/response pair. The following table illustrates an example of an Association Request frame body comprising a new Wake-up Parameters element (order 19).

TABLE 1

Association Request frame body

| Order | Information | Notes |
| --- | --- | --- |
| 1 | Capability | |
| 2 | Listen Interval | |
| 3 | SSID | |
| 4 | Supported rates | |
| 5 | Extended Supported Rates | The Extended Supported Rates element is present if there are more than eight supported rates, and it is optional otherwise. |
| 6 | Power Capability | The Power Capability elements is present if dot11SpectrumManagementRequired is true or dot11RadioMeasurementActivated is true. |
| 7 | Supported Channels | The Supported Channels element is present if dot11SpectrumManagementRequired is true and dot11ExtendedChannelSwitchActivated is false. |
| 8 | RSN | The RSNE is present if dot11RSNAActivated is true. |
| 9 | QoS Capability | The QoS Capability element is present if dot11QosOption-Implemented is true. |
| 10 | RM Enabled Capabilities | RM Enabled Capabilities element is present if dot11RadioMeasurementActivated is true. |
| 11 | Mobility Domain | The MDE is present in an Association Request frame if dot11FastBSSTransistionActivated is true and if the frame is being sent to an AP that advertised its FT capability in the MDE in its Beacon or Probe Response frame (i.e., AP also has dot11FastBSSTransitionActivated equal to true). |
| 12 | Supported Operating Classes | The Supported Operating Classes element is present if dot11ExtendedChannelSwitchActivated is true. |
| 13 | HT Capabilities | The HT Capabilities element is present when dot11HighThroughputOptionImplemented attribute is true. |
| 14 | 20/40 BSS Coexistence | The 20/40 BSS Coexistence element is optionally present when the dot112040BSSCoexistenceManagementSupport attribute is true |
| 15 | Extended Capabilities | The Extended Capabilities element is optionally present if any of the fields in this element are nonzero. |
| 16 | QoS Traffic Capability | The QoS Traffic Capability element is present if dot11MgmtOptionQoSTrafficCapabilityActivated is true. |
| 17 | TIM Broadcast Request | The TIM Broadcast Request element is present if dot11MgmtOptionTIMBroadcastActivated is true. |
| 18 | Interworking | The Interworking element is present if dot11InterworkingServiceActivated is true and the non-AP STA is requesting unauthenticated access to emergency services (see 10.3.5). |
| 19 | Wake-up Parameters | The Wake-up Parameters element is present if dot11WURActivated is true |
| Last | Vendor Specific | One or move vendor-specific elements are optionally present. These elements follow all other elements. |

FIG. 6 illustrates an example of a wake-up parameters element, which may be included in the Association request or other frame used as the request frame 200, 300. The response to the request 200, 300 with the transmission window indication, such as the response 504 or an Association Response, may comprise similar element with WUR mode parameters.

Figure 7:
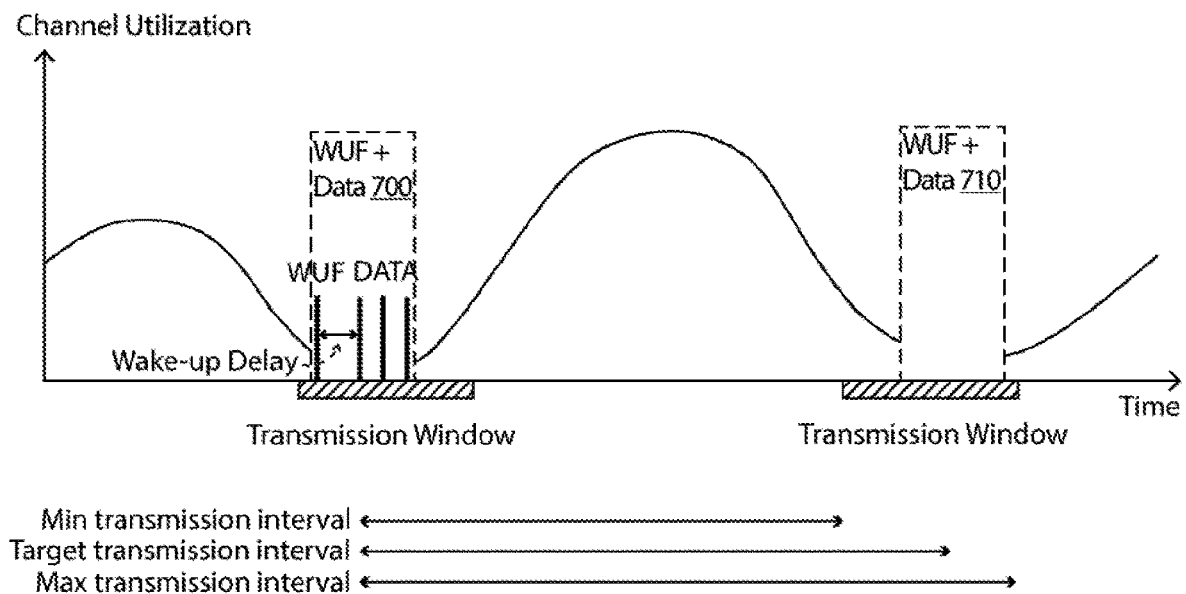
FIG. 7 illustrates an operation example in accordance with at least some embodiments of the present invention.

FIG. 7 illustrates an operation example according to some embodiments. Two transmission events 700, 710 triggered by respective wake-up frames (WUF) are illustrated. WUR parameters define the limits for WUF transmission to the STA 100 from the AP 110. The start time and the end time of the transmission windows may be negotiated based on the WUR parameters. FIG. 7 illustrates an example where interval parameters are applied for determining a plurality of transmission windows. The maximum transmission interval may define maximum interval between start of data transmission and end of data transmission of a subsequent event 710. The minimum transmission interval may define minimum interval between the two consecutive transmissions, and the AP may try to schedule the transmission to fall on or close to the target transmission interval. Wake-up delay, which may also be referred to as the wake-up guard time, is a further WUR parameter indicating the time required from reception of the WUF to send and receive through the 802.11 interface.

The AP 110 may use the WUR parameters to estimate the period during which the STA 100 could transmit it UL frames with minimal contention. The estimate would determine when to transmit the WUF to the STA. In the example of FIG. 7 the transmission window for the subsequent event 710 may be determined on the basis of the minimum interval and the maximum interval. The AP can use the wake-up delay information for timing when to send the WUF to increase probability that the STA is woken up and starts to transmit data when the channel utilization is low. The AP may also store and apply historical information (trend) to estimate how the channel utilization is behaving, and allocate the transmission window by utilizing such historical information.

In some embodiments, the AP 110 may after the wake-up delay send a frame to the STA 100 to trigger transmission of data. For example, a QoS CF-Poll frame may be applied to trigger uplink transmission from the STA that will upon receiving a WUF wait for a QoS CF-Poll frame from the AP until it transmits the data.

While some embodiments have been described in the context of IEEE 802.11 based system, it should be appreciated that these or other embodiments of the invention may be applicable to networks based on other technologies, such as other versions of the IEEE 802.11, WiMAX (Worldwide Interoperability for Microwave Access), UMTS LTE (Long-term Evolution for Universal Mobile Telecommunication System), LTE-Advanced, a fifth generation cellular communication system (5G), and other networks having similar power saving mode. Some embodiments may be applicable to networks having features defined by the IEEE 802.19.1 working group.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 8:
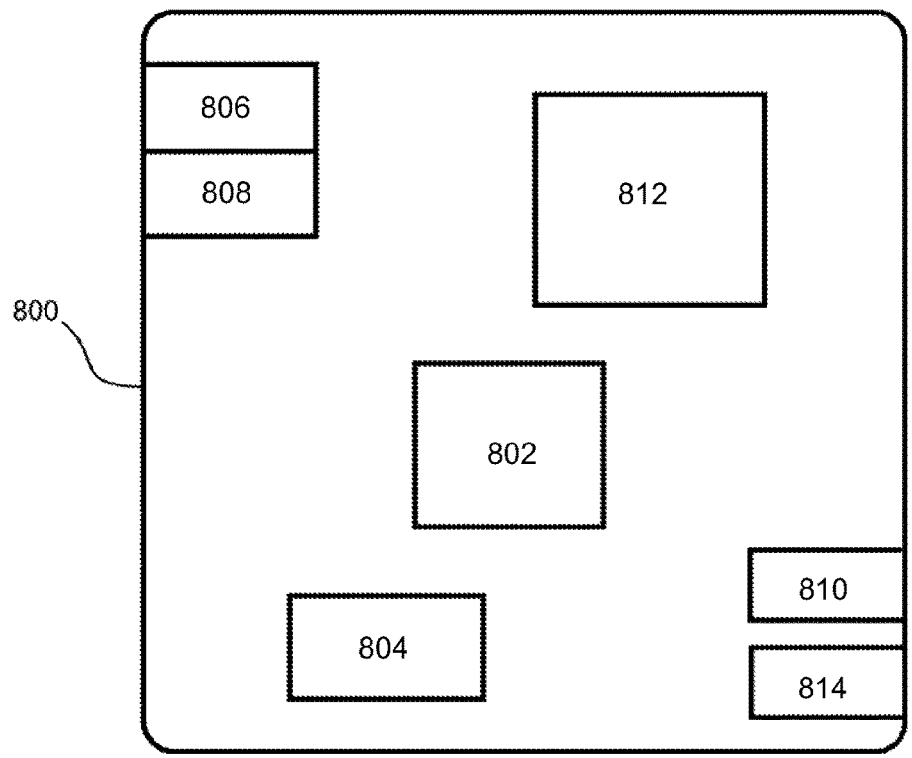
FIG. 8 illustrates an example apparatus capable of supporting at least some embodiments of the present invention.

FIG. 8 illustrates an example apparatus capable of supporting at least some embodiments of the present invention. Illustrated is a device 800, which may comprise a communication device, such as the terminal device STA 100 or the access point AP 110. The device may include wake-up radio functionality in accordance with at least some of the embodiments illustrated above. For example, the device 800 may be configured to perform the method illustrated in FIGS. 2 and/or 3, and at least some of the further embodiments thereof.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part accessible to the processor 802. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device.

The device 800 may comprise a main radio 806 and a wake-up radio 808. The main radio 806 and the WUR 808 may be configured to operate in accordance with at least one cellular or non-cellular standard. The main radio comprises at least one transmitter and at least one receiver. The WUR 808 comprises a receiver and/or transmitter. The main radio 806 may be configured to operate in accordance with long term evolution, LTE, WLAN, and/or worldwide interoperability for microwave access, WiMAX, standards, for example. The WUR 808 may be configured to operate according to IEEE 802.11 WUR, for example.

The device may comprise at least one controller controlling the main radio 806 and/or the WUR 808 wake-up radio functions according to presently disclosed embodiments. In particular, the controller may be arranged to cause at least some of the operations illustrated in connection with FIGS. 2 to 7, but may also be controlling other radio operations. The controller may be implemented by the processor 802, for example.

The device 800 may comprise one or more further radios 810, such as a transceiver for cellular communication and/or a near-field communication, NFC, transceiver. A further cellular radio may operate in accordance with global system for mobile communication, GSM, wideband code division multiple access, WCDMA, IS-95, LTE, or 5G, for example. The NFC transceiver may support at least one NFC technology, such as NFC, Bluetooth, Wibree or similar technologies.

The device 800 may comprise user interface, UI, 812. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 804 or on a cloud accessible via the main radio 806, or via the further radio 810, and/or to play games.

The device 800 may comprise or be arranged to accept a user identity module or other IC module 814. The user identity module may comprise, for example, a subscriber identity module, SIM, card installable in the device 800. The user identity module 814 may comprise information identifying a subscription of a user of device 800. The user identity module 814 may comprise cryptographic information usable to verify the identity of a user of device 800 and/or to facilitate encryption of communicated information and billing of the user of the device 800 for communication effected via the device 800.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver.

The device 800 may comprise further devices not illustrated in FIG. 8. For example, the device may comprise at least one digital camera. Some devices 800 may comprise a back-facing camera and a front-facing camera. The device may comprise a fingerprint sensor arranged to authenticate, at least in part, a user of the device. In some embodiments, the device lacks at least one device described above. For example, some devices may lack the further radio 810 and/or the user identity module 814.

The processor 802, the memory 804, the main radio 806, the WUR 808, the further radio 810, the UI 812 and/or the user identity module 814 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communications.

ACRONYMS LIST

AID Association identifier
AP Access point
ASIC Application-specific integrated circuit
BSS Basic service set
ESS Extended service set
FPGA Field-programmable gate array
GAS Generic advertisement service
GSM Global system for mobile communication
LP-WUR Low-power WUR
LTE Long term evolution
M2M Machine to machine
NFC Near-field communication NMS Network management system
QoS Quality of service
STA Station
TIM Traffic indication map
UI User interface
WCDMA Wideband code division multiple access
WiMAX Worldwide interoperability for microwave access
WLAN Wireless local area network
WUR Wake-up radio
WUF Wake-up frame

The invention claimed is:

1. An apparatus comprising
at least one processor,
at least one memory including computer program code, the at least one memory and the computer program code being configured to, with the at least one processor, cause the apparatus at least to:
transmit a request frame from a first wireless device to a second wireless device, the request frame indicating a request to allocate at least one transmission window for receiving a wake-up frame via a wake-up radio, receive a response to the request frame, the response indicating at least one allocated transmission window, and
receive, by the first wireless device from the second wireless device, the wake-up frame via the wake-up radio during the at least one allocated transmission window, wherein the at least one allocated transmission window is based on the request to allocate the at least one transmission window.

2. The apparatus of claim 1, wherein the processor, the memory, and the computer program code are configured to cause the apparatus to, upon receiving the wake-up frame, transmit uplink frames to the second wireless device via a main radio of the first wireless device.

3. The apparatus of claim 2, wherein the processor, the memory, and the computer program code are configured to cause the apparatus to receive the wake-up frame when the main radio is switched off and to activate the main radio in response to receiving the wake-up frame.

4. The apparatus of claim 1, wherein the request frame indicates a request for periodical transmission windows for receiving a plurality of wake-up frames, wherein the plurality of wake-up frames comprise the wake-up frame.

5. The apparatus of claim 1, wherein the request frame comprises parameters that indicate a start time of the at least one transmission window and an end time of the at least one transmission window.

6. The apparatus of claim 1, wherein the request frame comprises a parameter indicating delay for activating a main radio of the first wireless device.

7. The apparatus of claim 1, wherein the second wireless device is a wireless local area network access point and the first wireless device is a wireless local area network terminal.

8. The apparatus of claim 1, wherein the processor, the memory, and the computer program code are configured to cause the apparatus to transmit the request frame via the wake-up radio.

9. The apparatus of claim 1, wherein the processor, the memory, and the computer program code are configured to cause the apparatus to transmit the request frame via a main radio of the first wireless device.

10. The apparatus of claim 1, wherein the request frame is or comprises one of a wake-up sequence request, a wake-up radio mode request, a wake-up frame request, an association request, or a reassociation request with a wake-up parameters element.

11. The apparatus of claim 1, wherein the response to the request frame is indicating one or more parameters associated with allocation of the at least one allocated transmission window.

12. The apparatus of claim 11, wherein the response to the request frame is indicating existing configuration information associated with allocation of the at least one allocated transmission window.

13. An apparatus comprising
at least one processor,
at least one memory including computer program code, the at least one memory and the computer program code being configured to, with the at least one processor, cause the apparatus at least to:
receive a request frame by a second wireless device from a first wireless device, the request frame indicating a request to allocate at least one transmission window for receiving a wake-up frame via a wake-up radio,
transmit a response to the request frame, the response indicating at least one allocated transmission window, and
transmit from the second wireless device to the first wireless device, the wake-up frame during the at least one allocated transmission window, wherein the at least one allocated transmission window is based on the request to allocate the at least one transmission window.

14. The apparatus of claim 13, wherein the processor, the memory, and the computer program code are configured to cause the apparatus to receive uplink frames from the first wireless device via a main radio of the second wireless device after transmission of the wake-up frame during the at least one allocated transmission window.

15. The apparatus of claim 13, wherein the request frame indicates a request for periodical transmission windows for receiving a plurality of wake-up frames, wherein the plurality of wake-up frames comprise the wake-up frame, and the processor, the memory, and the computer program code are configured to cause the apparatus to periodically transmit wake-up frames during the allocated transmission windows.

16. The apparatus of claim 13, wherein the request frame comprises parameters that indicate a start time of the at least one transmission window and an end time of the at least one transmission window, and the processor, the memory, and the computer program code are configured to cause the apparatus to allocate the at least one allocated transmission window on the basis of the received parameters.

17. The apparatus of claim 13, wherein the request frame comprises a parameter indicating delay for activating a main radio of the first wireless device.

18. The apparatus of claim 13, wherein the processor, the memory, and the computer program code are configured to cause the apparatus to receive the request frame via a main radio of the second wireless device.

19. A method comprising:
transmitting a request frame, from a first wireless device to a second wireless device, the request frame indicating a request to allocate at least one transmission window for receiving a wake-up frame via a wake-up radio,
receiving a response to the request frame, the response indicating at least one allocated transmission window, and receiving, by the first wireless device from the second wireless device, the wake-up frame via the wake-up radio during the at least one allocated transmission window, wherein the at least one allocated transmission window is based on the at least one transmission window.

20. The method of claim 19, wherein uplink frames are transmitted to the second wireless device via a main radio of the first wireless device upon receiving the wake-up frame.

21. The method of claim 20, wherein the wake-up frame is received when the main radio is switched off and the main radio is activated in response to receiving the wake-up frame.

22. The method of claim 19, wherein the request frame indicates a request for periodical transmission windows for receiving a plurality of wake-up frames, wherein the plurality of wake-up frames comprise the wake-up frame.

* * * * *